(12) United States Patent  
Toksvig et al.

(10) Patent No.: US 9,203,696 B2
(45) Date of Patent: Dec. 1, 2015

(54) WI-FI ADMINISTRATION CONSOLE (71) Applicant: Facebook, Inc., Menlo Park, CA (US)

(72) Inventors: Michael John McKenzie Toksvig, Palo Alto, CA (US); Charles J. Hughes, Palo Alto, CA (US); Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 259 days.

(21) Appl. No.: 13/906,784

(22) Filed: May 31, 2013

(65) Prior Publication Data

US 2014/0359090 A1 Dec. 4, 2014

(51) Int. Cl.
*G06F 15/177* (2006.01)
*H04L 12/24* (2006.01)
*H04L 12/701* (2013.01)
*H04W 40/00* (2009.01)
*H04L 12/781* (2013.01)
*H04L 12/761* (2013.01)
*H04L 12/721* (2013.01)
*H04W 12/08* (2009.01)

(52) U.S. Cl.
CPC ............. *H04L 41/0816* (2013.01); *H04L 41/00* (2013.01); *H04L 41/08* (2013.01); *H04L 45/00* (2013.01); *H04L 45/14* (2013.01); *H04L 45/16* (2013.01); *H04L 45/52* (2013.01); *H04W 12/08* (2013.01); *H04W 40/00* (2013.01)

(58) Field of Classification Search
CPC ..... H04L 41/08; H04L 41/0816; H04L 41/00; H04L 45/00; H04L 45/14; H04L 45/16; H04L 45/52; H04W 40/00; H04W 12/08
See application file for complete search history.

(56) References Cited

U.S. PATENT DOCUMENTS

| | | | |
|---|---|---|---|
| 2008/0008202 A1* | 1/2008 | Terrell et al. | 370/401 |
| 2009/0187983 A1* | 7/2009 | Zerfos et al. | 726/10 |
| 2011/0080836 A1 | 4/2011 | Bragg | |
| 2011/0134798 A1* | 6/2011 | Magnuson et al. | 370/254 |
| 2012/0213228 A1 | 8/2012 | Scholl | |
| 2012/0281538 A1 | 11/2012 | Birk | |
| 2013/0067081 A1* | 3/2013 | Liu et al. | 709/225 |

FOREIGN PATENT DOCUMENTS

WO 2011/006231 A1 1/2011

OTHER PUBLICATIONS

International Search Report and Written Opinion for International Application PCT/2014/039918, Sep. 23, 2014.
Kok-Kiong Yap, et al. "Separating Authentication, Access and Accounting: A Case Study with Open WiFi," technical report, OpenFlow 2011-1. pp. 1-7, See pp. 4-6 and figures 2-5, Sep. 2011.

* cited by examiner

*Primary Examiner* — Krisna Lim
(74) *Attorney, Agent, or Firm* — Baker Botts L.L.P.

(57) ABSTRACT

In one embodiment, a method includes configuring a first router of a second entity to link the first router to a communication network of the second entity. The configuration of the first router establishes router-configuration data for the communication network on a computer system of a first entity. The method also includes configuring a second router of the second entity to link the second router to the communication network using at least some of the router-configuration data for the communication network established on the computer system of the first entity.

20 Claims, 5 Drawing Sheets

WI-FI ADMINISTRATION CONSOLE

TECHNICAL FIELD

This disclosure generally relates to communication networks.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, one or more routers of a particular communication network may be remotely configured through the configuration of a previously configured router. In particular embodiments, a site object may be created that corresponds to a particular webpage associated with a particular entity (e.g. a business). For example, the site object may include a bypass code and bypass mode, that may be the same for any gateway or router of the particular communication network. In particular embodiments, the routers may be configured to have one of two bypass modes, either when directed to the captive portal webview the network configuration may skip a check-in to the communication network or require a bypass code. Furthermore, if the configuration requires a bypass code, the bypass code is stored in the configuration.

In particular embodiments, configuration of the routers may be performed remotely through a particular configuration console. The configuration console may be accessed through the router to be configured and may include an interactive element or hyperlink to initiate the configuration process. For example, the configuration process may have the router send a request to the page to receive a credential authenticating the router on the communication network. Furthermore, the page may create a link between the router and the site object, if the site object already exists. Otherwise, the site object may be created. The additional routers may be configured by accessing the configuration console through each router and selecting the particular site object.

Other configuration options may include defining how long a connection between the computing device and router may last or incoming traffic limits. Router may periodically determine if activity of the computing device is within the limits set by the configuration.

DESCRIPTION OF EXAMPLE EMBODIMENTS

Figure 1:
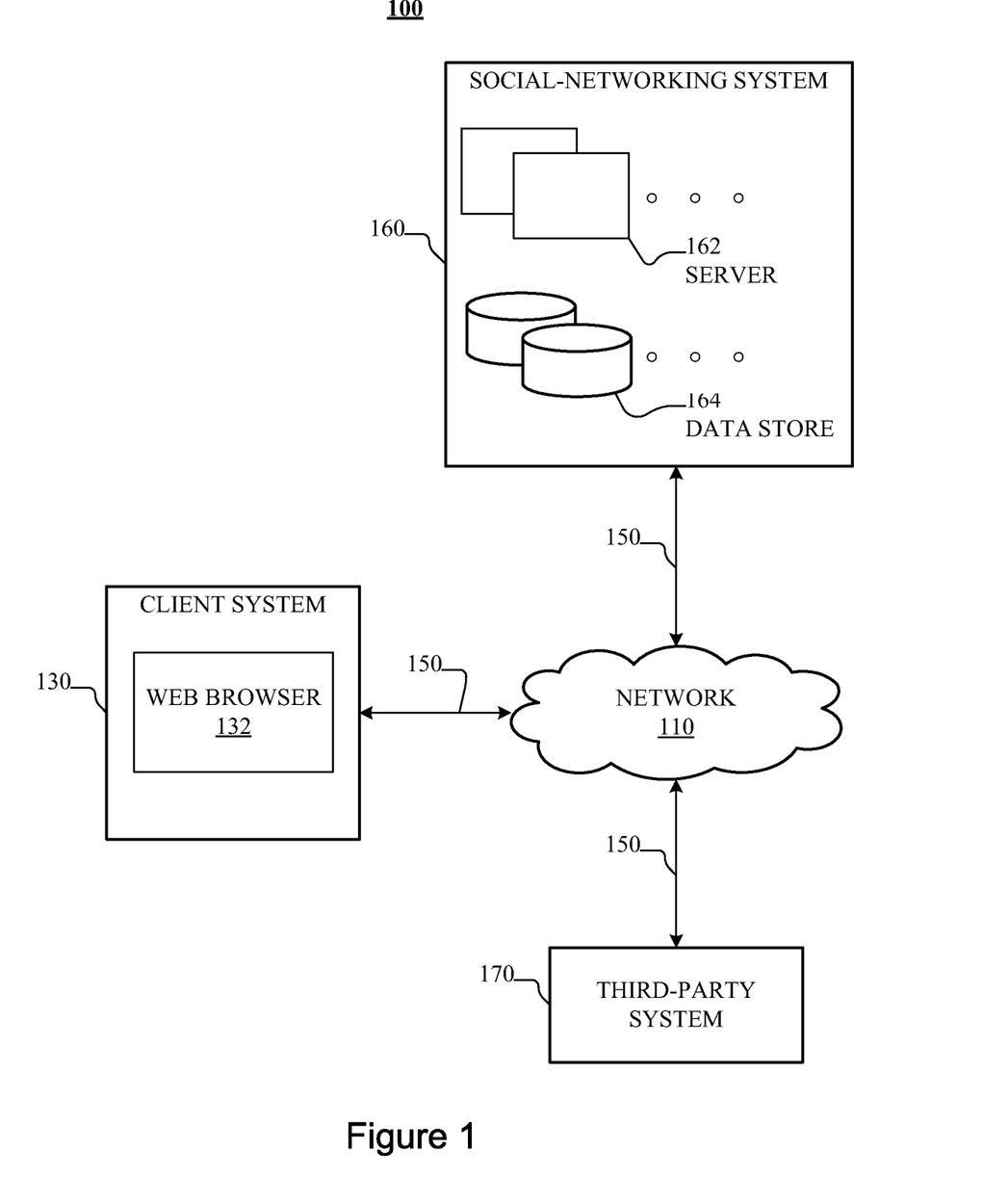
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example WI-FI or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a HTTP request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
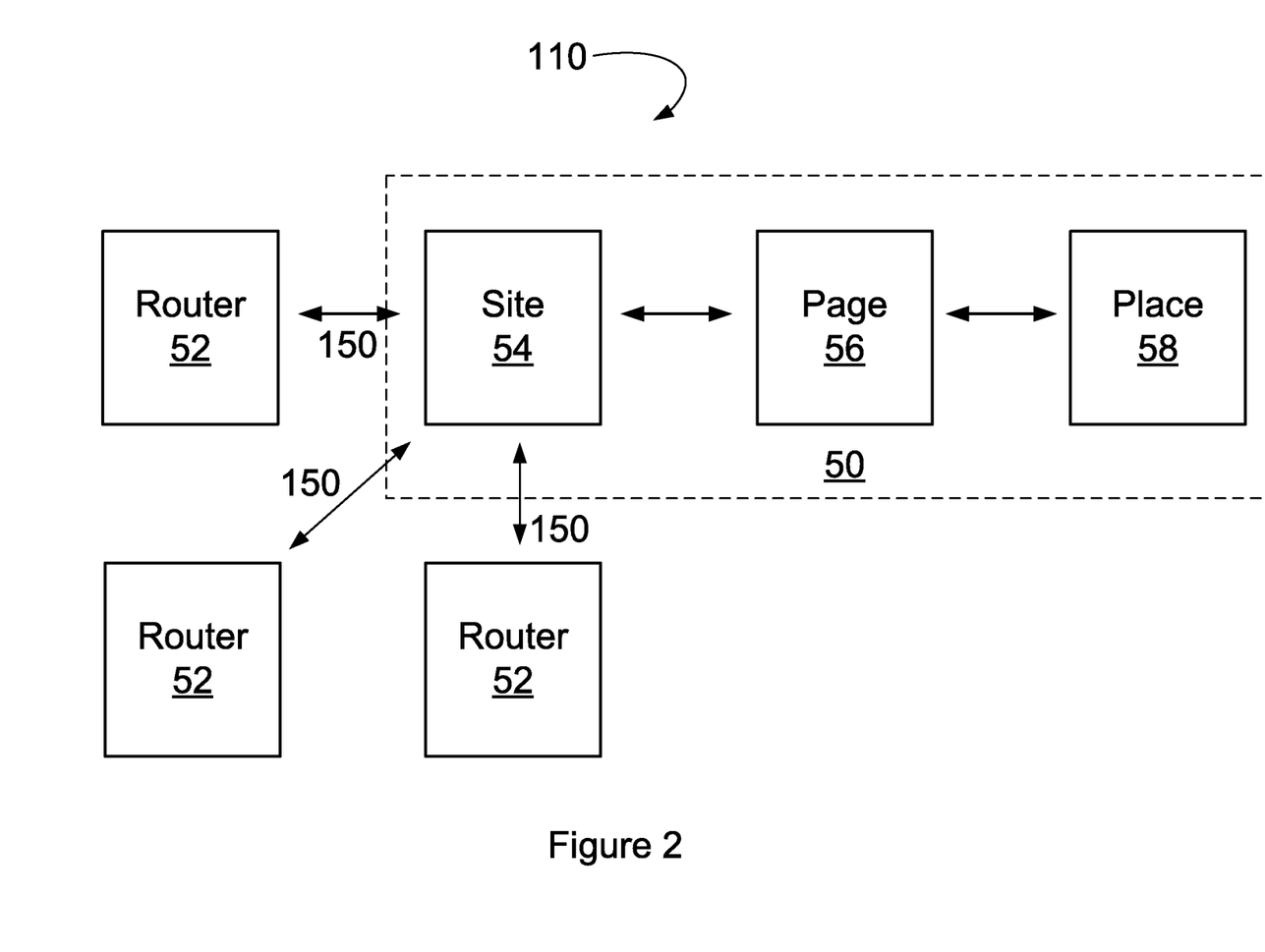
FIG. 2 illustrates an example communication network.

FIG. 2 illustrates an example communication network. In particular embodiments, a communication network 110 administered by a computer system 50 may include one or more routers 52. As an example and not by way of limitation, computer system 50 administering communication network 110 may be a computing infrastructure and platform that may include one or more components for computing, storage, networking, or any combination thereof. As described below, computer system 50 may host a webpage 56, place object 58, and site object 54 associated with the particular entity as part of administering communication network 110. In particular embodiments, computer system 50 administering communication network 110 may be unaffiliated with the particular entity that owns communication network 110. As an example and not by way of limitation, communication network 110 may be a LAN, such as for example a WI-FI network, and routers 52 of communication network 110 may be located at a geolocation associated with the particular entity, such as for example a business. In particular embodiments, configuration of routers 52 may be performed remotely through a particular configuration console hosted on computer system 50, as described below. As an example and not by way of limitation, the configuration console may be accessed through a particular router 52 to be configured and may include an interactive element or hyperlink to initiate the configuration process. Furthermore, the configuration process may have router 52 send a request for site object 54 to send a credential that authenticates router 52 on communication network 110.

Access to a WAN, such as for example the Internet, may be provided to one or more client systems through communication network 110. As an example and not by way of limitation, one or more client systems may access the Internet through communication network 110 of the particular entity, such as for example an airport authority, that is administered, such as for example by BOINGO, through computer system 50. As another example, computer system 50 may be at least part of a social-networking system described above. Access to communication network 110 may be provided in response to a user performing a logon procedure when connecting to communication network 110 through a client system. In particular embodiments, the logon procedure may include obtaining a login code, providing an e-mail address associated with the user, performing a "check in" at a geolocation associated with the particular entity, or any combination thereof. In particular embodiments, the user may be directed to a webpage or page 56 hosted by computer system 50, such as for example a business page hosted by a social-networking system, in response to connecting to communication network 110 through a client system.

In particular embodiments, routers 52 of the particular entity may be linked to communication network 110 through a configuration page or console hosted on computer system 50. In particular embodiments, site 54 and place 58 objects may be created by computing system 50 in response to configuring routers 52 for operation on communication network 110. As an example and not by way of limitation, a place object 58 may be generated by computer system 50 in response to receiving data associating communication network 110 with the geolocation of the entity. As another example, place object 58 may be linked to webpage 56 hosted on computer system 50. Location data stored by place object 58 may associate the particular entity with the geolocation and may include geographic coordinates, street address, or any suitable location data that may be resolved by a mapping system, such as for example GOOGLE MAPS or geographic information system (GIS).

Site object 54 may store router-configuration data for one or more routers 52 of the particular entity and may be linked with page 56. As an example and not by way of limitation, site object 54 may be created in response to initiating link 150 connecting router 52 to communication network 110. In particular embodiments, the router-configuration data may include data corresponding to a bypass code, bypass mode, or any combination thereof. As an example and not by way of limitation, routers 52 may be configured to operate in one of a plurality of bypass modes. For example, a particular bypass mode may require a user connecting to communication network 110 through one of routers 52 provide a bypass code through a network access page. Furthermore, entering the bypass code may also "check-in" the user at the geolocation of the particular entity, thereby associating the client system with the geographic coordinates stored by place object 58. As another example, a particular bypass mode may allow a user to directly connect to communication network 110 through one of routers 52 without performing an authentication procedure. As another example, routers 52 may configured to limit an amount of time the client system may be connected to communication network 110 or an amount of data sent by the client system to communication network 110. Furthermore, router 52 may be configured to monitor activity of each client system on communication network 110 and periodically determine whether the activity is within the limits set by the configuration of routers 52.

In particular embodiments, configuring and linking an initial one of routers 52 to communication network 110 may establish the router-configuration data stored on site object 54. As an example and not by way of limitation, an initial router 52 of communication network 110 may be configured through a configuration console, as described above. Furthermore, the router-configuration data established on site object 54 of computer system 50 may be used for configuration and linkage of subsequent routers 52 to communication network 110. Linking routers 52 to site object 54 may also link routers 52 to page 56 and place object 58 of the particular entity. In particular embodiments, routers 52 of communication network 110 of the particular entity may be linked to site 54 or place 56 objects through a link 150. This disclosure contemplates any suitable method of linking of objects, e.g. site or place, of computing system 50, such as for example through a bus, as described below, or a link 150, as described above. In particular embodiments, changes to site 54 or place 58 objects may be automatically propagated to routers 52. As an example and not by way of limitation, routers 52 of communication network 110 may be automatically associated with an updated geolocation in response to a geographic change of the geolocation of the particular entity to another geolocation. As another example, the operation of routers 52 may be automatically updated in response to modification of the router-configuration data corresponding to the bypass mode.

Figure 3:
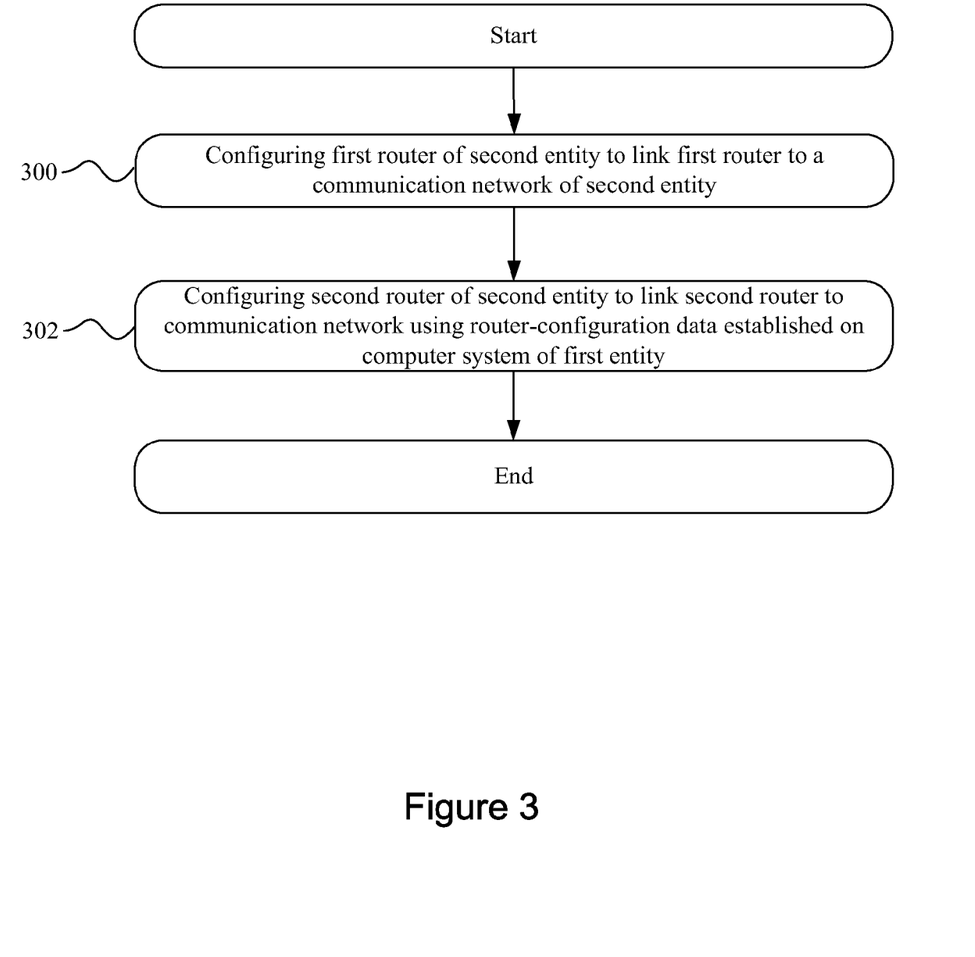
FIG. 3 illustrate an example method for configuring multiple routers.

FIG. 3 illustrates an example method for configuring multiple routers. The method may start at step 300, where a computer system of a first entity configures a first router of a second entity to link the first router to a communication network of the second entity. In particular embodiments, the configuration of the first router establishes router-configuration data for the communication network on the computer system of the first entity. In particular embodiments, the first router may linked to the communication network through a configuration console. At step 302, the computer system of the first entity may configure a second router of the second entity to link the second router to the communication network using at least some of the router-configuration data for the communication network established on the computer system of the first entity, at which point the method may end. In particular embodiments, the bypass code and bypass mode, described above, may be set through the configuration console. Although this disclosure describes and illustrates particular steps of the method of FIG. 3 as occurring in a particular order, this disclosure contemplates any suitable steps of the method of FIG. 3 occurring in any suitable order. Particular embodiments may repeat one or more steps of the method of FIG. 3, where appropriate. Moreover, although this disclosure describes and illustrates particular components carrying out particular steps of the method of FIG. 3, this disclosure contemplates any suitable combination of any suitable components, such as for example a processor of a mobile computing device or a server of a computing system, carrying out any suitable steps of the method of FIG. 3.

Figure 4:
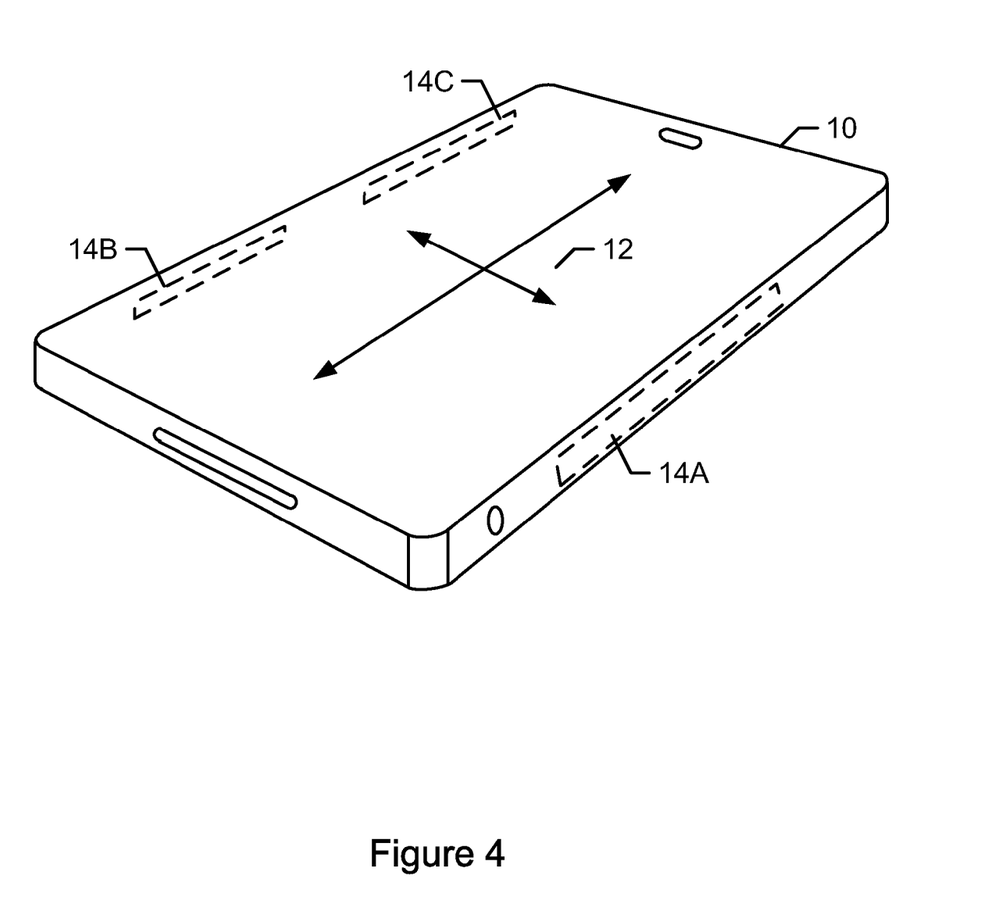
FIG. 4 illustrates an example mobile computing device.

FIG. 4 illustrates an example mobile computing device. In particular embodiments, a client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 4, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 4, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM)

waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

Figure 5:
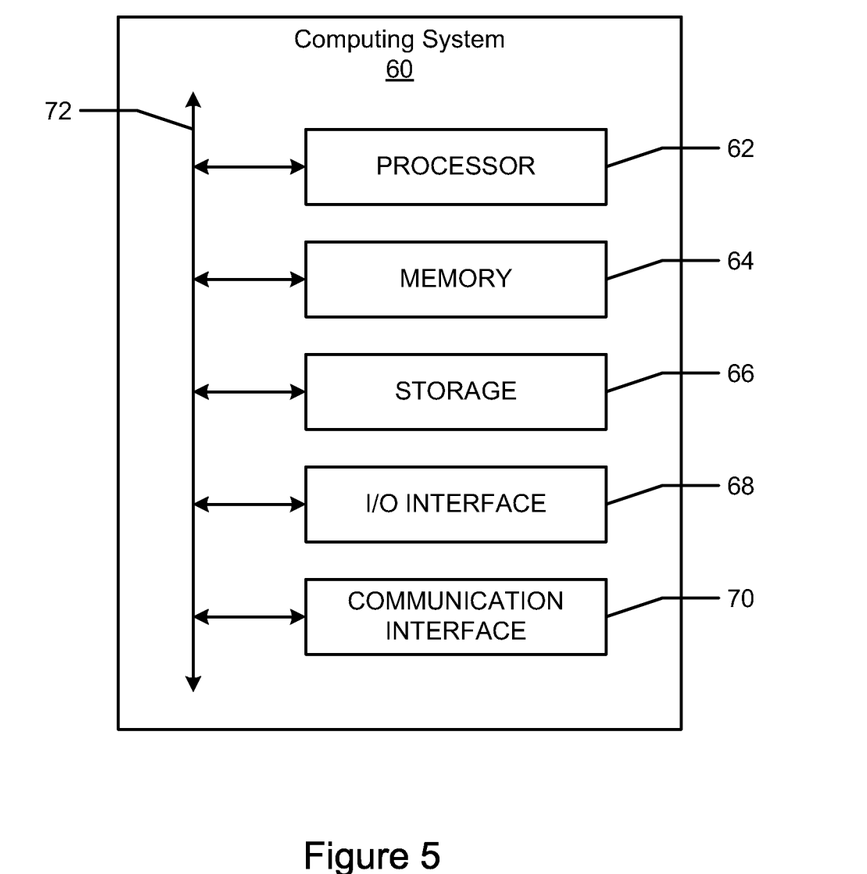
FIG. 5 illustrates an example computing system.

FIG. 5 illustrates an example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile computing system 10, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a server system of a first entity, remotely configuring a first router of a second entity to link the first router to a communication network of the second entity, the configuration of the first router storing configuration data for one or more second routers of the second entity on the server system of the first entity; and
by the server system of the first entity, subsequently configuring one or more of the second routers of the second entity using at least some of the configuration data stored on the server system of the first entity, thereby linking the one or more of the second routers to the communication network.

2. The method of claim 1, further comprising, by the server system of the first entity, creating:
a page object for linking the routers with a geolocation of the second entity; and
a site object for storing the configuration data.

3. The method of claim 2, further comprising, by the server system of the first entity, modifying the page object in response to a geographic change of the geolocation of the second entity.

4. The method of claim 3, wherein the geographic change comprises modifying one or more geographic coordinates defining the geolocation.

5. The method of claim 1, wherein the configuration data comprises information associated with a bypass mode or a bypass code for configuring the first or second routers.

6. The method of claim 1, wherein:
the communication network comprises a WI-FI network; and
the first entity comprises a social-networking system.

7. The method of claim 1, further comprising, by the server system of the first entity, presenting a router-configuration console for configuring the first or second routers.

8. The method of claim 1, wherein linking the first router to the communication network comprises, by the server system of the first entity, sending a credential to the first router in response to receiving a request linking the first router to the communication network.

9. One or more computer-readable non-transitory storage media embodying software configured when executed by a computing device to:
remotely configure a first router of a first entity to link the first router to a communication network of the first entity, the configuration of the first router storing configuration data for one or more second routers of the first entity on a server system of a second entity; and
subsequently configure one or more second routers of the first entity using at least some of the configuration data stored on the server system of the second entity, thereby linking the one or more of the second routers to the communication network.

10. The media of claim 9, wherein the software is further configured to create:
a page object for linking the routers with a geolocation of the first entity; and
a site object for storing the router-configuration data.

11. The media of claim 10, wherein the software is further configured to modify the page object in response to a geographic change of the geolocation of the first entity.

12. The media of claim 11, wherein the geographic change comprises modifying one or more geographic coordinates defining the geolocation.

13. The media of claim 9, wherein the router-configuration data comprises information associated with a bypass mode or a bypass code for configuring the first or second routers.

14. The media of claim 9, wherein:
the communication network comprises a WI-FI network; and
the second entity comprises a social-networking system.

15. The media of claim 9, wherein the software is further configured to present a router-configuration console for configuring the routers.

16. The media of claim 9, wherein the software is further configured to send a credential to the first router in response to receiving a request linking the first router to the communication network.

17. A server system of a first entity comprising:
a processor; and
one or more computer-readable non-transitory storage media coupled to the processor and embodying software that:
remotely configure a first router of a second entity to link the first router to a communication network of the second entity, the configuration of the first router storing configuration data for one or more second routers of the second entity on the server system of the first entity; and
subsequently configure one or more second routers of the second entity using at least some of the configuration data stored on the server system of the first entity, thereby linking the one or more of the second routers to the communication network.

18. The server system of claim 17, wherein the software is further configured to create:
a page object for linking the routers with a geolocation of the second entity; and
a site object for storing the router-configuration data.

19. The server system of claim 17, wherein the router-configuration data comprises information associated with a bypass mode or a bypass code for configuring the first or second routers.

20. The server system of claim 17, wherein:
the communication network comprises a WI-FI network; and
the first entity comprises a social-networking system.

* * * * *